United States Patent [19]

Kaneko et al.

[11] Patent Number: 4,725,994
[45] Date of Patent: Feb. 16, 1988

[54] ULTRASONIC TRANSDUCER WITH A MULTIPLE-FOLDED PIEZOELECTRIC POLYMER FILM

[75] Inventors: Nagao Kaneko, Yokohama; Nanao Nakamura, Kawasaki, both of Japan

[73] Assignee: Kabushiki Kaisha Toshiba, Kawasaki, Japan

[21] Appl. No.: 729,734

[22] Filed: May 2, 1985

[30] Foreign Application Priority Data

Jun. 14, 1984 [JP] Japan .................. 59-122280
Jun. 14, 1984 [JP] Japan .................. 59-122281

[51] Int. Cl.$^4$ .................. H04R 17/00; H01L 41/08
[52] U.S. Cl. .................. 367/140; 367/164; 367/160; 310/334; 310/800
[58] Field of Search .......... 310/331, 334, 332, 337, 310/370, 338, 800; 367/155, 157, 160, 161, 164, 180, 140; 29/594, 602 A; 53/462; 493/355, 362, 405

[56] References Cited

U.S. PATENT DOCUMENTS

| | | | |
|---|---|---|---|
| 3,074,327 | 1/1963 | Grahn | 493/362 |
| 3,177,382 | 4/1965 | Green | 310/337 X |
| 4,028,566 | 6/1977 | Franssen et al. | 310/800 X |
| 4,032,929 | 6/1977 | Fischbeck et al. | 310/328 X |
| 4,205,248 | 5/1980 | Negita | 310/370 |
| 4,322,877 | 4/1982 | Taylor | 29/594 X |
| 4,330,730 | 5/1982 | Kurz et al. | 310/800 |
| 4,376,302 | 3/1983 | Miller | 367/141 X |
| 4,469,978 | 9/1984 | Hamada et al. | 310/331 |

FOREIGN PATENT DOCUMENTS

| | | |
|---|---|---|
| 55-115799 | 9/1980 | Japan . |
| 55-151893 | 9/1980 | Japan . |
| 56-47199 | 4/1981 | Japan . |

OTHER PUBLICATIONS

Patent Abstracts of Japan, vol. 9, No. 185 (E-332) [1908], 31st Jul. 1985; & JP-A-60 54 599 (Toshiba K. K.) 29.03.1985.
Patent Abstracts of Japan, vol. 5, No. 109 (E-65) [781], 15th Jul. 1981; & JP-A-56 47 199 (Toray K. K.) 28-04-1981.

*Primary Examiner*—Deborah L. Kyle
*Assistant Examiner*—Brian S. Steinberger
*Attorney, Agent, or Firm*—Oblon, Fisher, Spivak, McClelland & Maier

[57] ABSTRACT

An ultrasonic transducer includes a piezoelectric polymer film folded as at least two layers and having electrodes on both the surfaces thereof. The ultrasonic transducer is responsive to a signal, applied across electrodes, to produce an ultrasonic wave to be focused at one spot so that it is converted to an electric signal. In this ultrasonic transducer, a groove or through holes are formed on and along the folded area of the piezoelectric polymer film.

10 Claims, 11 Drawing Figures

ULTRASONIC TRANSDUCER WITH A MULTIPLE-FOLDED PIEZOELECTRIC POLYMER FILM

BACKGROUND OF THE INVENTION

This invention relates to an ultrasonic transducer with a multiple-folded piezoelectric polymer film.

In general, as a linear array type ultrasonic transducer for use on a linear electron scanning system use may be made of an array type in which a ceramics piezoelectric substratum, such as lead titanate or lead titanate zirconate, includes strip-like elements. This type of ceramics piezoelectric substratum is hard and brittle in nature and tends to produce defects and cracks when the strip-like elements are obtained. Furthermore, it is difficult to precisely form many strip-like elements. Many problems are also involved from the standpoint of manufacturing costs.

It is known that a fluorine-containing high polymer, such as polyvinylidene fluoride ($PVF_2$) or polyvinylidene-triethylene fluoride copolymer ($PVF_2.TrFE$), or the other organic synthetic high polymer is polarized at high temperatures under a high electric field to manifest its piezoelectricity and pyroelectricity. Recently, an ultrasonic transducer has actively been developed utilizing the thickness shear mode of the piezoelectric high polymer. The specific acoustic impedance of this piezoelectric polymer is close to that of a human body and, moreover, a smaller elasticity is involved on the piezoelectric polymer. It is said that, if the piezoelectric polymer is applied to a linear array type ultrasonic transducer, it is unnecessary, unlike the ceramics piezoelectric substratum, to obtain strip-like elements by a cutting operation or a separating operation.

The dielectric constant of the piezoelectric polymer film is, in general, of the order of 10, i.e., prominently smaller than that of the ceramics piezoelectric substratum. Furthermore, the drive elements of the linear array type ultrasonic transducer have a smaller area and an extremely high acoustic impedance. Usually, a poor matching is involved against a 50 Ω power source (transmitting/receiving circuit), suffering an appreciable loss on the ultrasonic transducer.

In order to solve the above-mentioned problems, an ultrasonic transducer has been proposed in which a plurality of piezoelectric polymer films are properly piled up to obtain a thicker polymer film while at the same time the electric impedance is lowered. This type of conventional ultrasonic transducer is shown in FIG. 1. In the conventional ultrasonic transducer, a plurality of piezoelectric polymer films (3, 3, 3), each, have strip-like electrodes 1 on one surface and a common electrode 2 on the other surface and are piled up such that the two adjacent piezoelectric polymer films have their identical electrodes located opposite to each other as shown in FIG. 1. The opposite, identical electrodes of the adjacent two polymer films are connected by a solder or a conductive adhesive 4 to each other. For example, the strip-like electrode 1 of the first piezoelectric polymer film is located opposite to the strip-like electrode 1 of the corresponding adjacent second piezoelectric polymer film. Such a type of ultrasonic transducer is known which lowers an electric impedance. With Zo representing an electric impedance of, for example, a single layer of a resonant frequency f, $$Z = Z_o/n^2$$

(n: the number of layers) for the ultrasonic transducer of the configuration as shown in FIG. 1. An electric impedance of ¼ is involved for a two-layer structure and an electric impedance of 1/9 is involved for a three-layer structure. It is, therefore, possible to obtain an improved matching with respect to a power source. In the conventional arrangement as shown in FIG. 1 it would be difficult to take leads 5a and 5b out of the electrodes 1 and 2, respectively.

An ultrasonic transducer of such a type as shown in FIG. 2 has also been proposed which has a continuous, piezoelectric polymer film 3a properly folded as a multiple-layer structure of a desired thickness. In this transducer, it is easier to take leads from the corresponding electrodes and it is also possible to lower the electric impedance. However, the following problems arise therefrom.

That is, if a continuous, piezoelectric polymer film is to be folded, it would be difficult to precisely locate the corresponding areas of the strip-like electrodes opposite to each other. In this case, a possible displacement is produced in the vertical directions of the electrodes 1, causing a difference in the electric impedance of drive elements and producing a possible shorting between the drive elements. This problem becomes prominent with an increase in the number of layers so piled up.

SUMMARY OF THE INVENTION

It is accordingly an object of this invention to provide an ultrasonic transducer having a piezoelectric polymer film which is readily folded as a multiplelayer structure and which assures a ready, accurate alignment between the opposite areas of corresponding electrodes.

According to this invention there is provided an ultrasonic transducer including a piezoelectric polymer film having electrodes on both the surfaces thereof and folded as at least two layers, the piezoelectric polymer film being responsive to a signal applied to the electrodes to generate an ultrasonic wave focused on one spot and being adapted to receive an ultrasonic wave to convert it to an electric signal, in which a groove is formed along a folding line on the piezoelectric polymer film.

BRIEF DESCRIPTION OF THE DRAWINGS

This invention will be explained below with reference to the accompanying drawings.

DETAILED DESCRIPTION OF THE PREFERRED EMBODIMENTS

The embodiments of this invention will be explained below by referring to FIGS. 3 to 11 of the accompanying drawings.

First, an ultrasonic transducer according to the embodiment of this invention will be explained below in more detail by referring to FIGS. 3 to 7.

Figure 1:
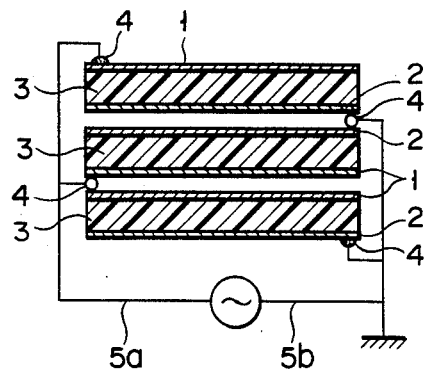
FIGS. 1 and 2 are cross-sectional views showing a conventional ultrasonic transducer.
Figure 2:
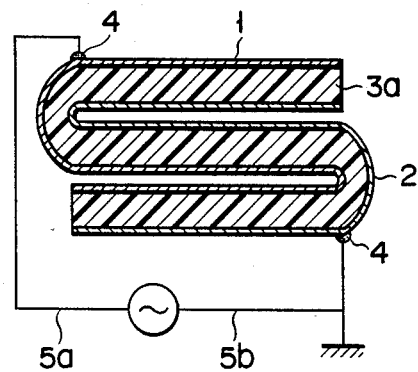
Figure 3:
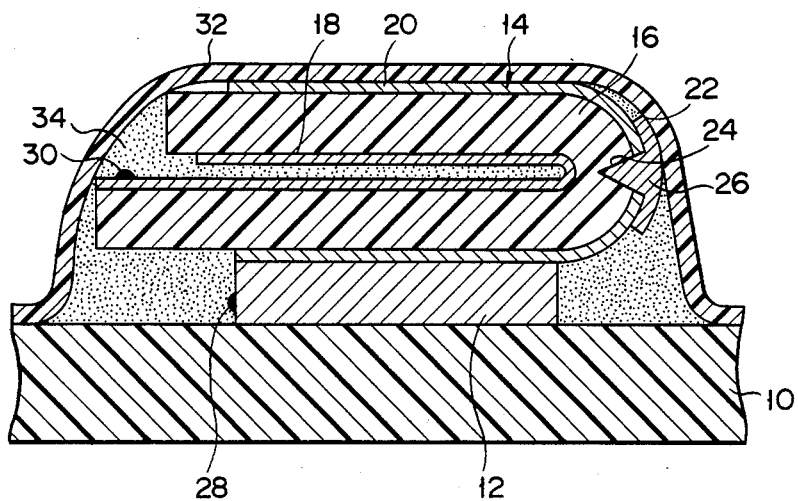
FIG. 3 is a diagrammatic, cross-sectional view showing an ultrasonic transducer according to a first embodiment of this invention.

In FIG. 3, reference numeral 10 shows a support made of, for example, an acrylic resin. A copper plate 12 is fixed on the support 10 and serves as a 200 $\mu$m-thick sound reflecting plate and a common electrode. A once-folded piezoelectric film 14 is disposed on the copper plate 12 and has a PVF$_2$ piezoelectric element 16. A plurality of strip-like electrodes 18 made of silver are equidistantly provided on one surface of the piezoelectric element 16 and a common electrode 20, made of silver, is provided on the whole area of the other surface of the piezoelectric element 16. At the common electrode of the PVF$_2$ piezoelectric element 16 a V-shaped groove 24 is formed on a substantially central portion of a folded area 22 of the piezoelectric element 16 such that it is located along the folding line, i.e., in a direction perpendicular to that in which the strip-like electrode 18 extends. The V-shaped groove 24 is formed across substantially one half of the thickness of the piezoelectric element with the common electrode 20 separated.

Figure 4:
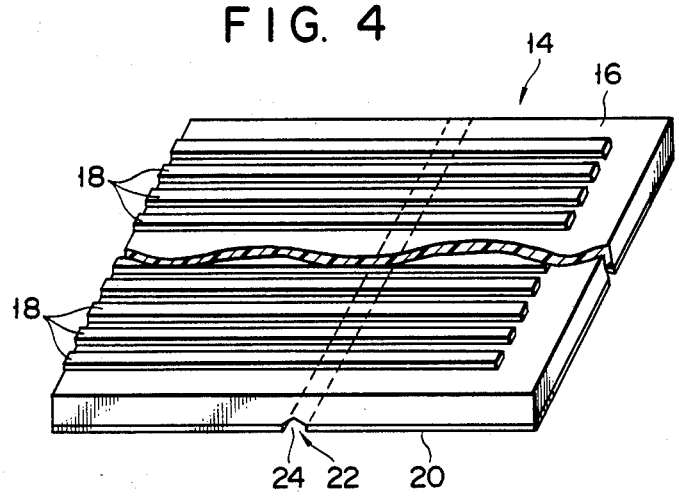
FIG. 4 is a perspective view diagrammatically showing a state previous to that in which a piezoelectric element of the ultrasonic transducer as shown in FIG. 3 is folded.

FIG. 4 is a perspective view showing a state before the piezoelectric film 14 is folded. The piezoelectric body as shown in FIG. 4 is folded back upon itself along the folding line with the V-shaped groove 24 located at the outer side as shown in FIG. 3.

The folded piezoelectric film 14 is disposed on the copper plate 12 such that the common electrode 20 is in contact with the copper plate 12.

The common electrode 20, though separated by the V-shaped groove 24 as set out above, has its separated areas mutually connected by, for example, a conductive paste 26 which is deposited at and near the V-shaped groove 24 as shown in FIG. 3. As the conductive paste use may be made of an epoxy resin mixed with carbon, copper or silver powders.

The folded piezoelectric film 14 is manufactured by the following method.

An about 1 $\mu$m-thick silver layer is deposited by, for example, a vacuum deposition method on both the surfaces of an about 50 $\mu$m-thick PVF$_2$ film which is obtained by a uniaxial stretching method. The resultant structure is polarized under an electric field of 6 KV at 100° C. for 1 hour and then cooled down to room temperature to yield a PVF$_2$ piezoelectric element 16. In this case, one surface of the PVF$_2$ film is subjected to a patterning as shown in FIG. 4, forming a plurality of strip-like electrodes 18 in a manner to be in parallel with the direction in which uniaxial stretching is carried out. As the strip-like electrodes, 64 unit electrode elements are formed having a dimension of about 0.9 mm in width $\times$ about 35 mm in length with an element-to-element gap of about 0.1 mm. The other surface of the PVF$_2$ film is subjected to a patterning to form the common electrode 20 made of silver. A V-shaped groove 24 of about 30 $\mu$m in depth $\times$ about 0.2 mm in width is formed by, for example, a cutter along a folding line. The resultant structure is folded back upon itself once along the V-shaped groove 24 to provide the above-mentioned PVF$_2$ piezoelectric film 14. Then, a conductive paste 26 is deposited at and near the V-shaped groove 24 and dried to provide a folded piezoelectric film 14 in which the common electrode areas separated by the V-shaped groove are connected to each other. A lead 28 is connected to the copper plate 12 and a lead 30 is connected to the respective strip-like electrode 18 of the folded piezoelectric film 14 such that it is located at one end portion of the piezoelectric film 14 and on the inner side of the folded piezoelectric film 14. A polyester film of, for example, 12 $\mu$m in thickness is covered on the resultant structure, noting that an epoxy resin 34 is filled in a space between the polyester film 32 and the piezoelectric structure. The epoxy resin 34 is commercially available under the trade name of 301-2 manufactured by Epotek Co., Ltd. The presence of the epoxy resin 34 positively retains the state in which the piezoelectric film 14 is folded back upon itself, and also assures a positive fixing of the piezoelectric film 14 to the support 10.

In the embodiment of this invention, a folding operation can readily been carried out, since the V-shaped groove 24 is formed on one surface, for example, on the common electrode side, of the PVF$_2$ piezoelectric structure to be folded back upon itself. This specific arrangement permits the upper portion of the folded piezoelectric structure to be accurately aligned with the lower portion thereof in a substantially parallel array. As a result, there is no possibility that the impedance of drive elements will vary due to a misalignment between the oppositely facing strip-like electrodes of the folded piezoelectric structure and that short-circuiting will occur between the drive elements. It is therefore possible to obtain a linear array type ultrasonic transducer of high reliability.

In actual practice, the linear array type ultrasonic transducer was measured, but no electric impedance variation was not observed across the unit electrode elements. When a pulse voltage was applied between the common electrode 20 and eight of the unit electrode elements, the ultrasonic transducer was operated at a frequency of 5 MHz.

The PVF$_2$ piezoelectric transducer may be formed in a multiple-folded fashion to obtain a linear array type ultrasonic transducer of a low electric impedance. Even in this case, it is possible to readily perform such a folding operation.

Furthermore, a V-shaped groove 24 is formed along each folding line, preventing the folded area from being extremely bulged.

Figure 11:
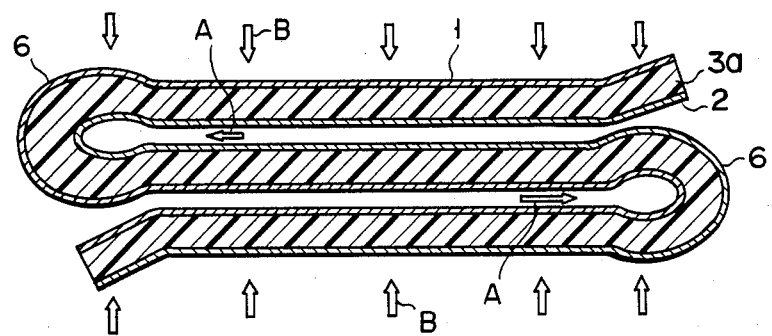

It has been confirmed that, if the folded area of the conventional piezoelectric body as set out below is bulged as shown in FIG. 11, an electric loss or an "electric stroke" occurs on the bulged area, or an acoustic coupling, for example, occurs there, causing a disturbance of ultrasonic radiation beams.

In the embodiment of this invention it is possible to prevent such an electric loss or a possible disturbance of ultrasonic radiation beams, because there is no bulging area at the folded area of the piezoelectric film. It is therefore, possible to obtain an ultrasonic transducer assuring an excellent performance.

Figure 5:
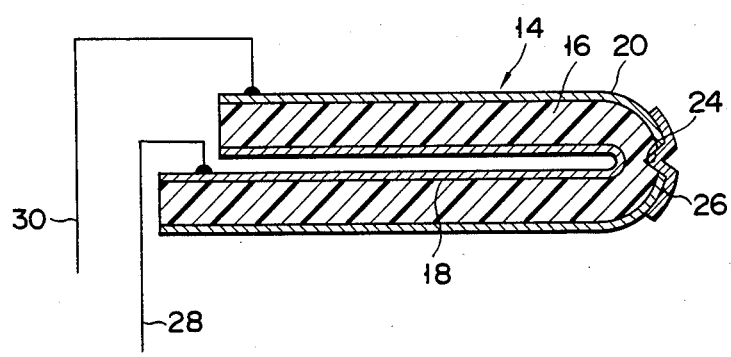
FIGS. 5 to 7 are cross-sectional views diagrammatically showing a modified form of piezoelectric film with respect to the ultrasonic transducer of this invention.

In the embodiment of this invention, the groove 24 is provided on one surface, for example, on the common electrode side, of the piezoelectric film 14 such that their separated areas of the common electrode are electrically connected through the conductive paste or metal film 26 deposited at or near the groove 24. However, this invention is not restricted thereto. For example, the metal film 26 for electrical connection may be provided, by a vapor deposition method or a sputtering method, on the V-shaped groove 24 at the folded area 22 of the piezoelectric film 14 as shown in FIG. 5.

Figure 6:
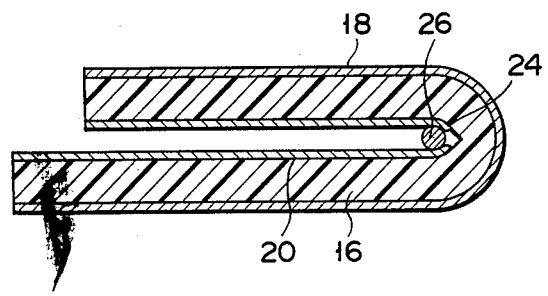
Figure 7:
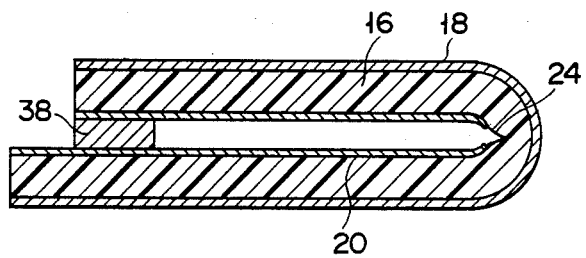

As shown in FIG. 6, the piezoelectric film may be folded back upon itself with a V-shaped groove 24 internally formed along a folding line on the opposite, inner, common electrode 20 areas of the piezoelectric film. In this case, a conductive paste 26 may be deposited at the V-shaped groove 24 to permit the separated areas of the common electrode to be connected together.

Where the piezoelectric film 14 is folded back upon itself with the groove 24 inside, it is still possible to locate a conductive plate 38 at a proper place between the opposite, inner, common electrode areas to permit an electrical connection to be made therebetween.

The leads 28 and 30 may be connected at any place to the common electrode 20 and strip-like electrode 18, respectively. For example, the leads 28 and 29 may be connected to the corresponding electrodes, respectively, such that, as shown in FIG. 5, the lead 30 extends on the upper side of the electrode 20 and the lead 28 extends on the lower side of the electrode 18.

An ultrasonic transducer according to a second embodiment of this invention will be explained below by referring to FIGS. 8 and 9. The same reference numerals are employed to designate parts or elements corresponding to those shown in the first embodiment of this invention. Further explanation is therefore omitted.

Figure 8:
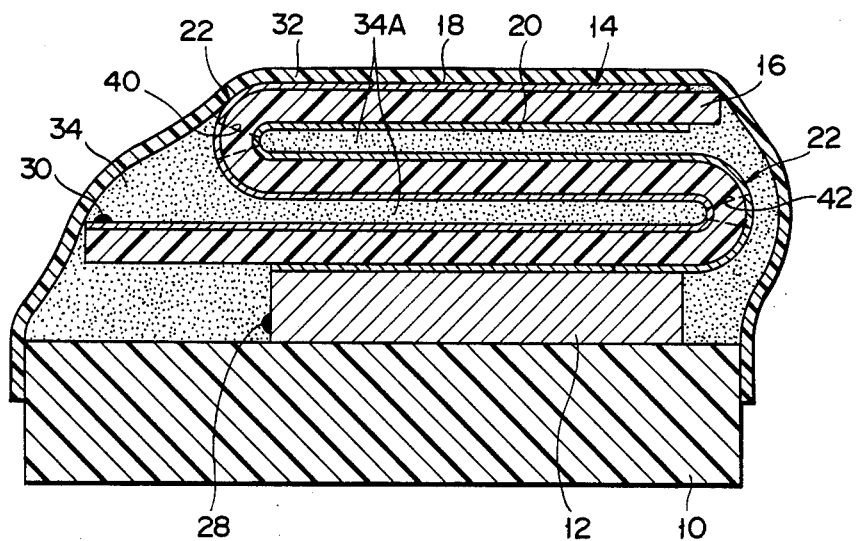
FIG. 8 is a cross-sectional view diagrammatically showing an ultrasonic transducer according to a second embodiment of this invention.
Figure 9:
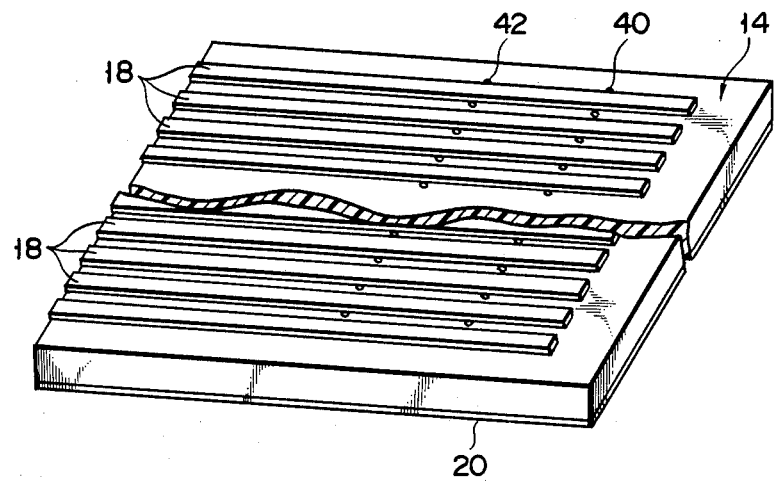
FIG. 9 is a perspective view diagrammatically showing a state previous to that in which a piezoelectric film of the ultrasonic transducer of FIG. 8 is folded.

In the ultrasonic transducer according to a second embodiment, two folded areas 22, 22 are formed on a piezoelectric element 16 to provide a three-layer piezoelectric structure as shown in FIG. 8. Through holes 40, 42 are formed at the folded areas of the piezoelectric element in place of the V-shaped groove 24 set out above.

That is, the through holes are formed, in two rows, at those locations adjacent to strip-like electrodes 18 on a piezoelectric film 14 such that they are located in a directon perpendicular to that in which the strip-like electrodes 18 extend. The piezoelectric film 14 is folded, along the two rows (40, 42) of the through holes, with an adhesive layer 34A initially coated thereon, providing the piezoelectric film structure with the adhesive layer filled therein.

The piezoelectric film 14 is manufactured as follows:

First, an about 1 μm-thick silver layer is deposited by, for example, a vacuum deposition method on both the surfaces of an about 50 μm-thick PVF$_2$ film which is obtained by a uniaxial stretching step. The resultant structure is polarized under an electric field of 6 KV at 100° C. for one hour and cooled down to room temperature to provide a PVF$_2$ piezoelectric structure. In this case, a silver layer on one surface of the piezoelectric structure is subjected to a patterning as shown in FIG. 9 to provide strip-like electrodes 18 in a direction parallel to that in which uniaxial stretching is carried out. As the strip-like electrodes 18, 64 unit electrode elements are formed each having a dimension of 0.9 mm in width × 45 mm in length with an element-to-element gap of 0.1 mm. The silver layer on the other surface of the piezoelectric structure is subjected, as required, to a patterning to provide a common electrode 20. Then, small through holes (40, 42) of about 50 μm in diameter are formed, by a laser beam, in two rows on those fold formation areas 22 which are adjacent to the strip-like electrodes 18. Then, the resultant PVF$_2$ piezoelectric structure 14 is folded along two rows (40, 42) of the through holes to provide an S-shaped (three-layered) piezoelectric structure as shown in FIG. 8 with an epoxy resin series adhesive cemented by a press. The adhesive is commercially available under the trade name of 301-2 manufactured by Epotek Co., Ltd. A lead 28 is connected to a copper plate 12 and a lead 30 is connected to the respective strip-like electrode 18. A polyester film 32 of, for example, 12 μm in thickness is covered on the piezoelectric structure to provide a ultrasonic transducer as shown in FIG. 8 in which the adhesive (301-2) is occupied therein. In this connection it is to be noted that the piezoelectric structure is supported on a support 11.

According to the second embodiment of this invention, although the piezoelectric structure is folded along the two rows (40, 42), it is possible to obtain the same effects as shown in the first embodiment of this invention. Furthermore, it is not necessary to employ any conductive paste for electrical connection, because the respective electrodes are not electrically separated by the through holes (40, 42). The adhesive layer 34A is passed through the through holes (40, 42) of the piezoelectric film 14 to suppress the bulging of the folded area to a small extent. At the same time, any excessive amount of adhesive in the layer-to-layer gap can be removed to form a very uniform, thin adhesive layer 34A. When, therefore, the ultrasonic transducer is operated, it is possible to eliminate a possible acoustic coupling and "electric stroke" at those areas adjacent to the strip-like electrodes where no voltage is applied.

Figure 10:
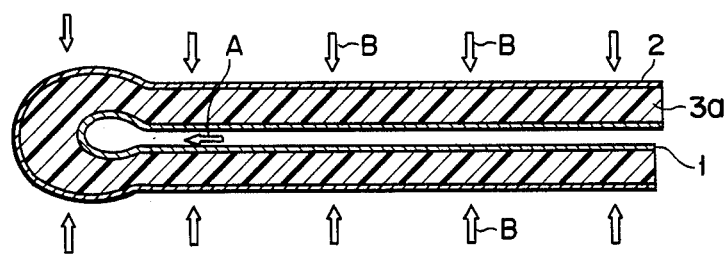
FIGS. 10 and 11 are cross sectional views diagrammatically showing a piezoelectric film of a conventional ultrasonic transducer for use in explaining an advantage of the embodiment of this invention.

When a length of a piezoelectric polymer 3a is doubled back upon itself as shown in FIGS. 10 and 11, a force acts in a direction as indicated by arrows B, causing the adhesive to be moved toward the folded area (i.e. in a direction as indicated by an arrow A) where it is concentrated to cause the folded area to be bulged as shown in FIGS. 10 and 11.

In the ultrasonic transducer according to the second embodiment of this invention no bulging occurs, since no excessive amount of adhesive flows toward the folded area due to the presence of the holes 40, 42. Furthermore, when the PVF$_2$ piezoelectric film 14 is to be multiple-folded to provide a linear array type ultrasonic transducer of a low electric impedance, a folding operation can be readily effected along the through holes (40, 42).

According to this invention, since the through holes (40, 42) are formed on the folded area of the PVF$_2$ piezoelectric film 14, an extra amount of adhesive is passed out through the through holes (40, 42) during the folding/cementing step to obtain an integral unit. It is also possible to obtain a modified form of PVF$_2$ piezoelectric film which includes, for example, a continuous, vertical, multi-folded structure including concave layers.

According to this invention, the through holes, though formed by a laser beam on the PVF$_2$ piezoelectric film, may be formed by, for example, a melting method or a mechanical method on the PVF$_2$ piezoelectric film.

It is desirable for the through holes to be formed on the non-working areas between the respective strip-like electrodes as in the second embodiment. However, they are formed on the strip-like electrodes so far as the operation of the ultrasonic transducer is not affected by the configuration of the strip-like electrodes. The through holes may also be formed on the boundary area between the working and non-working areas if a narrow gap is defined between the strip-like electrodes.

This invention is not restricted to the abovementioned embodiments. Various changes or modifications may be made without departing from the spirit and scope of this invention.

For example, the piezoelectric film may be formed with four or more folding areas, instead of being formed with two or three folding areas.

According to the above-mentioned embodiments, as the $PVF_2$ piezoelectric body use is made of a piezo-electric material, but use may also be made of a fluorine-containing synthetic high polymer, such as TrFE, or the other organic high polymers showing the piezoelectricity, or a complex piezoelectric film prepared by mixing with a high polymer resin a ceramics type piezoelectric powder such as powdered lead titanate or lead titanate zirconate.

What is claimed is:

1. An ultrasonic transducer responsive to an electric signal to produce an ultrasonic wave to be focused on one spot and adapted to receive an ultrasonic wave to convert it to an electric signal, comprising a piezoelectric polymer film having electrodes on both the surfaces thereof and folded as at least two layers along a corresponding folding line, said piezoelectric polymer film having a groove cut therein, said groove corresponding to said folding line along which said piezoelectric polymer film is folded, wherein said groove defining said folding line minimizes bulging of the folded piezoelectric polymer film at the folding line after folding thereby to minimize electric loss, electric stroke and ultrasonic radiation beam disturbance, and further minimizes misalignment between folded portions of the piezoelectric polymer film thereby to minimize impedance variations.

2. The ultrasonic transducer according to claim 1, in which said groove on a folded area of said piezoelectric polymer film is formed on a side on which an outside electrode of said electrodes is located.

3. The ultrasonic transducer according to claim 1, in which said groove on a folded area of said piezoelectric polymer film is formed on a side on which an inside electrode of said electrodes is located.

4. The ultrasonic transducer according to claim 1, in which said groove on a folded area of said piezoelectric polymer film extends along said folding line and separates one of said electrodes into two areas and a conductive material is provided to permit said electrode areas to be connected to each other.

5. The ultrasonic transducer according to claim 4, in which said groove is V-shaped in cross section.

6. The ultrasonic transducer according to claim 4, in which said groove on said folded area of said piezoelectric polymer film is covered with a conductive paste.

7. The ultrasonic transducer according to claim 4, in which said conductive material is occupied in a space between the opposite layers of said folded piezoelectric polymer film and serves as a spacer and said electrode areas separated by said groove are electrically connected to each other through said spacer, said spacer supporting said piezoelectric polymer film in place to leave a substantially uniform layer of said conductive material between the opposite layers of said folded piezoelectric polymer film.

8. An ultrasonic transducer responsive to an electric signal to produce an ultrasonic wave to be focused on one spot and adapted to receive an ultrasonic wave to convert it to an electric signal, comprising a piezoelectric polymer film having electrodes on both the surfaces thereof and folded as at least two layers along a corresponding folding line, wherein said holes defining said folding line minimizes bulging of the folded piezoelectric polymer film at the folding line after folding thereby to minimize electric loss, electic stroke and ultrasonic radiation beam disturbance, and further minimizes misalignment between folded portions of the piezoelectric polymer film thereby to minimize impedance variations.

9. The ultrasonic transducer according to claim 8, in which said holes on the folded area of said piezoelectric polymer film extend through said piezoelectric polymer film.

10. The ultrasonic transducer according to claim 8, in which said electrodes are comprised of a common electrode formed on one surface of said piezoelectric polymer film and strip-like electrodes equidistantly formed on the other surface of said piezoelectric polymer film, said holes being formed between said strip-like electrodes.

* * * * *